United States Patent
Zhang et al.

(10) Patent No.: US 11,210,254 B2
(45) Date of Patent: Dec. 28, 2021

(54) METHODS, ELECTRONIC DEVICES, STORAGE SYSTEMS, AND COMPUTER PROGRAM PRODUCTS FOR STORAGE MANAGEMENT

(71) Applicant: EMC IP Holding Company LLC, Hopkinton, MA (US)

(72) Inventors: Min Zhang, Shanghai (CN); Qiulin Cheng, Shanghai (CN); Rui Chang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/883,182

(22) Filed: May 26, 2020

(65) Prior Publication Data

US 2021/0117361 A1 Apr. 22, 2021

(30) Foreign Application Priority Data

Oct. 21, 2019 (CN) .......................... 201911002717.9

(51) Int. Cl.
*G06F 3/06* (2006.01)
*G06F 13/40* (2006.01)
*G06F 13/42* (2006.01)

(52) U.S. Cl.
CPC ...... *G06F 13/4068* (2013.01); *G06F 13/4022* (2013.01); *G06F 13/4282* (2013.01); *G06F 2213/0026* (2013.01); *G06F 2213/0028* (2013.01)

(58) Field of Classification Search
None
See application file for complete search history.

(56) References Cited

U.S. PATENT DOCUMENTS

| | | | |
|---|---|---|---|
| 10,628,366 B2 * | 4/2020 | Hartman | G06F 13/4081 |
| 10,635,320 B2 | 4/2020 | Zhai et al. | |
| 10,635,348 B2 | 4/2020 | Yang et al. | |
| 10,678,437 B2 | 6/2020 | Xu et al. | |
| 11,023,161 B1 | 6/2021 | Anchi et al. | |
| 11,044,347 B2 | 6/2021 | Kumar et al. | |
| 2001/0049766 A1 * | 12/2001 | Stafford | G06F 13/4004 711/103 |
| 2004/0128627 A1 * | 7/2004 | Zayas | G06F 30/30 716/100 |
| 2005/0138191 A1 * | 6/2005 | Seto | H04L 29/06 709/230 |

(Continued)

*Primary Examiner* — Hyun Nam
(74) *Attorney, Agent, or Firm* — BainwoodHuang (57) ABSTRACT

Techniques for the storage management involve, in response to detecting that a storage device is plugged into the storage system, determining, at a computing device of a storage system and based on attributes of the storage device, a target interface device matching the storage device from a plurality of types of interface devices in the storage system, the interface device managing the storage device having attributes matching one of the plurality of types; determining an association between the storage device and the target interface device; and generating, based on the association, information characterizing a state of the storage device in the computing device. In this way, it is possible to support at least two different types of disks in the existing storage system, improving the compatibility and scalability of the system.

18 Claims, 5 Drawing Sheets

(56) References Cited

U.S. PATENT DOCUMENTS

| | | | | |
|---|---|---|---|---|
| 2005/0251593 | A1* | 11/2005 | Lin | G06K 19/07 |
| | | | | 710/62 |
| 2010/0199257 | A1* | 8/2010 | Biggerstaff | G06F 8/456 |
| | | | | 717/104 |
| 2014/0052929 | A1* | 2/2014 | Gulati | G06F 12/0815 |
| | | | | 711/141 |
| 2015/0095565 | A1* | 4/2015 | Morris | G11C 11/4096 |
| | | | | 711/109 |
| 2015/0220478 | A1* | 8/2015 | Klughart | G06F 3/0619 |
| | | | | 710/313 |
| 2015/0254200 | A1* | 9/2015 | McGlone | G06F 1/3278 |
| | | | | 710/316 |
| 2019/0227922 | A1* | 7/2019 | Braun | G06F 13/4022 |

\* cited by examiner

METHODS, ELECTRONIC DEVICES, STORAGE SYSTEMS, AND COMPUTER PROGRAM PRODUCTS FOR STORAGE MANAGEMENT

CROSS-REFERENCE TO RELATED APPLICATION

This application claims priority to Chinese Patent Application No. CN201911002717.9, on file at the China National Intellectual Property Administration (CNIPA), having a filing date of Oct. 21, 2019, and having "METHODS, ELECTRONIC DEVICES, STORAGE SYSTEMS, AND COMPUTER PROGRAM PRODUCTS FOR STORAGE MANAGEMENT" as a title, the contents and teachings of which are herein incorporated by reference in their entirety.

FIELD

Embodiments of the present disclosure generally relate to the field of data storage, and more specifically, to a method, device, and computer program product for the storage management.

BACKGROUND

For the next generation storage products, Non-Volatile Memory express (NVMe) interface disks will be deployed, and thus also including the NVMe Disk Processor Enclosure (DPE), such as disk enclosures or servers. Usually, the NVMe disks are connected to the DPE like the Serial Attached Small Computer System Interface (SAS) disks, to expand more NVMe capacity. Considering the improvement of IO performance and easy management, NVMe disks are expected to replace SAS disks in the future.

However, in the current transition period, where NVMe disks and SAS disks coexist in the market, NVMe disks should be compatible with the use environment of SAS disks, so that customers can choose a suitable storage solution based on cost and application.

SUMMARY

The embodiments of the present disclosure provide a method, device, and computer program product for storage management.

In a first aspect, a method for storage management is provided. The method includes in response to detecting that a storage device is plugged into the storage system, determining, at a computing device of a storage system and based on attributes of the storage device, a target interface device matching the storage device from a plurality of types of interface devices in the storage system, the interface device managing the storage device having attributes matching one of the plurality of types; determining an association between the storage device and the target interface device; and generating, based on the association, information characterizing a state of the storage device in the computing device.

In a second aspect, an electronic device is provided. The device includes a processor and a memory coupled to the processor and storing instructions to be executed, the instructions when executed by the processor causing the device to execute acts. The acts include in response to detecting that a storage device is plugged into the storage system, determining, at a computing device of a storage system and based on attributes of the storage device, a target interface device matching the storage device from a plurality of types of interface devices in the storage system, the interface device managing the storage device having attributes matching one of the plurality of types; determining an association between the storage device and the target interface device; and generating, based on the association, information characterizing a state of the storage device in the computing device.

In a third aspect, there is provided a storage system. The storage system includes at least one disk, connected to the storage system through a slot; a plurality of types of interface devices, the interface device managing the storage device having attributes matching one of the plurality of types; and an electronic device of the second aspect, connected to the plurality of types of the interface devices.

In a fourth aspect, there is provided a computer program product tangibly stored on a non-transient computer readable medium and including machine executable instructions which cause, when executed, a machine to perform the method in the first aspect.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar symbols refer to the same or similar elements.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Various example embodiments of the present disclosure will be described below with reference to the accompanying drawings. It would be appreciated that these drawings and description are provided only as example embodiments. It should be pointed out that alternative embodiments of the structure and method disclosed herein can be envisioned from the following description, and these alternative embodiments may be used without departing from principles as claimed herein.

It is to be understood that these example embodiments are discussed only for the purpose of enabling those skilled persons in the art to better understand and thus implement the present disclosure, rather than suggesting any limitations to the scope of the present disclosure.

As used herein, the term "includes", "comprises" and its variants are to be read as open-ended terms that mean "includes/comprises, but is not limited to." The term "based on" is to be read as "based at least in part on." The term "some embodiments" is to be read as "at least some embodiments"; and the term "another embodiment" is to be read as "at least one another embodiment". Relevant definitions of other terms may be included below.

Figure 1:
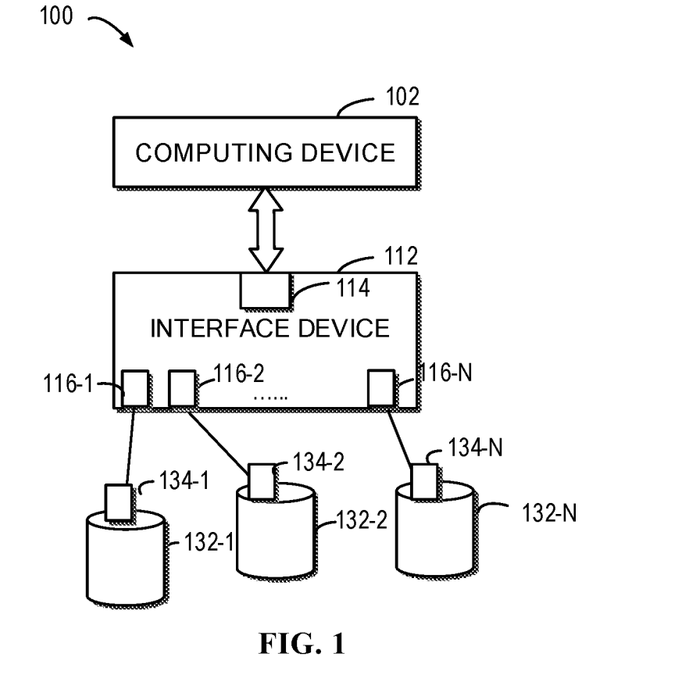
FIG. 1 illustrates a schematic diagram of an example operating environment in which embodiments of the present disclosure can be implemented.

FIG. 1 illustrates a schematic diagram of an example operating environment 100 in which embodiments of the present disclosure can be implemented. It would be appreciated that the structure and functionalities of the operating environment 100 are described merely as an example, without suggesting any limitation to the scope of the present disclosure. The embodiments of the present disclosure may be applied to the operating environment 100 having a different structure and/or functionalities.

As shown in FIG. 1, the operating environment 100 includes storage devices 132-1 to 132-N, which may also be referred to as storage devices 132 collectively. It should be understood that the number of storage devices shown in FIG. 1 is merely by way of example and is not intended to limit the scope of the present disclosure.

The storage device 132 may be a non-volatile storage device or a storage unit, such as a solid state drive (SSD), a magnetic disk, and the like. The storage device 132 may follow an appropriate interface specification, such as NVMe interface specification. The storage device 132 following the NVMe interface specification may be referred to as an NVMe device or an NVMe disk. The storage capacity of each storage device 132 may be any size. The storage device 132 may also, for example, be referred to disks follow SAS protocol. The storage device 132 following the SAS protocol may also be referred to as a SAS disk.

The storage device 132 (for example, storage devices 132-3 to 132-N) may be connected to the computing device 102 via a Just a Bunch Of Disks (JBOD) array enclosure. JBOD may also be referred to as a Disk Array Enclosure (DAE). JBOD is an independent array enclosure external to the computing device, which may support the interaction between the computing device and the connected storage device. In some embodiments, the JBOD is an external device that is independent of the computing device 102 and may not have storage management or processing functions.

In the operating environment 100, the computing device 102 is configured to control input/output (I/O) operations to the storage device 132. The computing device 102 may also be referred to as a storage server or host device. If the computing device 102 receives a request from the user or other device, the computing device 102 may perform data read and write operations on the storage device 132 and may manage data access and storage in the storage device 132.

The operating environment 100 includes, for example, an interface device 112. The interface device 112 may be connected to the storage device 132 and also be connected to the computing device 102. Thus, the computing device 102 can implement I/O operation control on the storage devices 132.

As shown in FIG. 1, in the operating environment 100, the interface device 112 may include a plurality of downstream ports 116-1 to 116-N. The downstream ports 116-1 to 116-N can be considered as connectors. The storage device 132 (for example, the storage devices 132-3 to 132-N) may be connected to one downstream port of the interface device 112 via a slot, for example, the storage device 132-1 may be connected to the downstream port 116-1 of the interface device 112 via the slot 134-1 (e.g., one of multiple storage device slots provided by a physical enclosure into which the storage device is plugged).

The interface device 112 may also include an upstream port 114, which may be connected to the computing device 102. In some embodiments, the upstream port 114 may include, for example, an expansion port based on the PCIe protocol. In some embodiments, the storage device 132 may be connected to the interface device 112 via a bus and the interface device 112 may also be connected to the computing device 102 via the bus. The type of the bus may also be different according to different types of the interface device 112.

Hereinafter the downstream ports 116-1 to 116-N of the switch 112 may also be referred to as downstream ports 116 collectively. In the present disclosure, an upstream port may be referred to a port connecting a switch to a computing device, and an upstream port may be referred to a port connecting a switch to a storage device. The terms "upstream port" and "upstream port" herein are not intended to limit the data transmission direction. In other words, through the downstream port, the storage device can send data to the switch, and the switch can also send data to the storage device. Similarly, through the upstream port, the computing device can send data to the switch, and the switch can also send data to the computing device. As a switch, data communication is performed between the upstream port and the downstream port in accordance with the internal switching structure, so that the data is forwarded to the corresponding destination.

As described above, for the next generation storage products, disks having NVMe interface will be deployed, and thus also including the NVMe DPE, such as disk enclosures or servers. Usually, the NVMe disks are connected to the DPE like the SAS disks, to expand more NVMe capacity. Considering the improvement of IO performance and easy management, NVMe disks are expected to replace SAS disks in the future.

However, in the current transition period, where NVMe disks and SAS disks coexist in the market, NVMe disks should be compatible with the use environment of SAS disks, so that customers can choose a suitable storage solution based on cost and application.

The current operating environment often can only support a single type of storage device, which is caused by the limitation of the interface protocol of the interface device and the storage device supported by the computing device. Therefore, it is expected that different types of storage devices can be connected to the storage system, and the types of storage devices connected to each slot can be flexibly replaced. Accordingly, it is expected that the system can support interface protocols of various storage devices.

According to the embodiments of the present disclosure, a storage management approach is proposed to achieve compatibility of interface protocols of multiple storage devices. In this solution, when a storage device is detected to be connected to a storage system via a slot, the storage device can be associated with an interface device having a type matching an attribute by determining the attribute of the storage device, and the computing device can be caused to generate information characterizing the state of the storage device without paying attention to the attribute of the storage device.

Figure 2A:
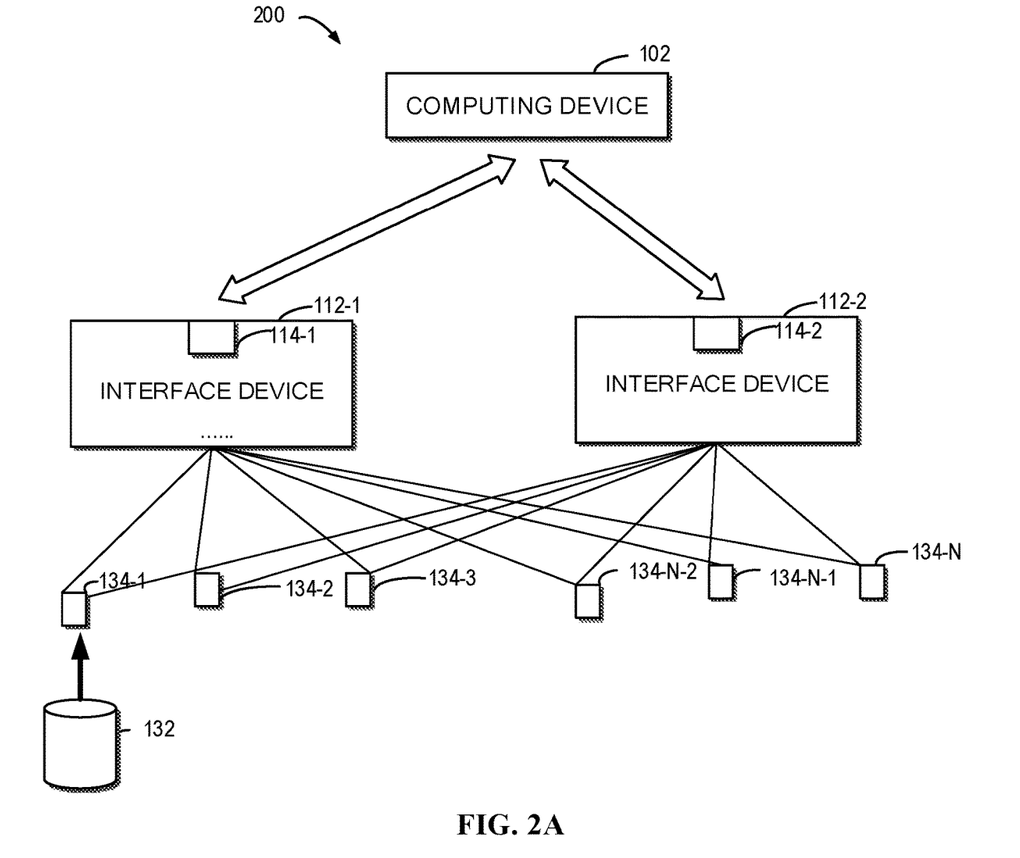
FIG. 2A illustrates a schematic block diagram of the storage system according to embodiments of the present disclosure.

Hereinafter, example embodiments of the present disclosure will be described in detail with reference to the accompanying drawings. FIG. 2A illustrates a storage system 200 according to embodiments in the present disclosure. In the system 200, the same or similar components as those in the operating environment 100 shown in FIG. 1 have the same or similar reference numerals.

The system 200 may include interface devices 112-1 and 112-2, which may have different types, for example. In the present disclosure, multiple interface devices of different types may be considered as the multiple interface devices capable of supporting storage devices having different interface protocols. The interface device 112-1 includes an upstream port 114-1 and the interface device 112-2 includes an upstream port 114-2 for connecting to the computing device 102.

Similar to FIG. 1, the computing device 102 is configured to control I/O operations to the storage device. The computing device 102 may also be referred to as a storage server or host device. The computing device 102 may perform data read and write operations on the storage device based on a request from the user or other device, and may manage data access and data storage in the storage device.

The storage device 132 can be connected to the storage system 200 through any of the plurality of slots 134-1 to 134-N. As shown in FIG. 2A, different types of interface devices 112-1 and 112-2 can support each of the plurality of slots 134-1 to 134-N, respectively.

If the storage system 200 detects the storage device 132, for example, is connected to the storage system 200 via the slot 134-1, the storage system 200 can determine the attributes of the storage device 132. Based on the attributes of the storage device 200, the storage system 200 can determine a target interface device that matches the attributes of the storage device 132 from different types of interface devices 112-1 and 112-2.

According to some embodiments, if the storage device 132 is determined as a SAS type storage device, a SAS expander, such as the interface device 112-1, can be determined as the target interface device. According to some embodiments, if the storage device 132 is determined to be a NVMe type storage device, a PCIe switch, such as the interface device 112-2, can be determined as the target interface device.

Once the target interface device is determined, the association between the target interface device and the storage device 132 can be determined. For example, the target interface device can establish an object associated with the storage device 132. If the storage device 132 is a SAS-type storage device, an object associated with the SAS-type storage device is created by the SAS expander. If the storage device 132 is an NVMe-type storage device, an object associated with the NVMe type storage device is established by the PCIe switch. Correspondingly, the SAS expander can be considered as the hardware implementation of the SAS domain management layer object of the SAS type storage device, and the PCIe switch can be considered as the hardware implementation of the NVMe domain management layer object of the NVMe type storage device.

Figure 2B:
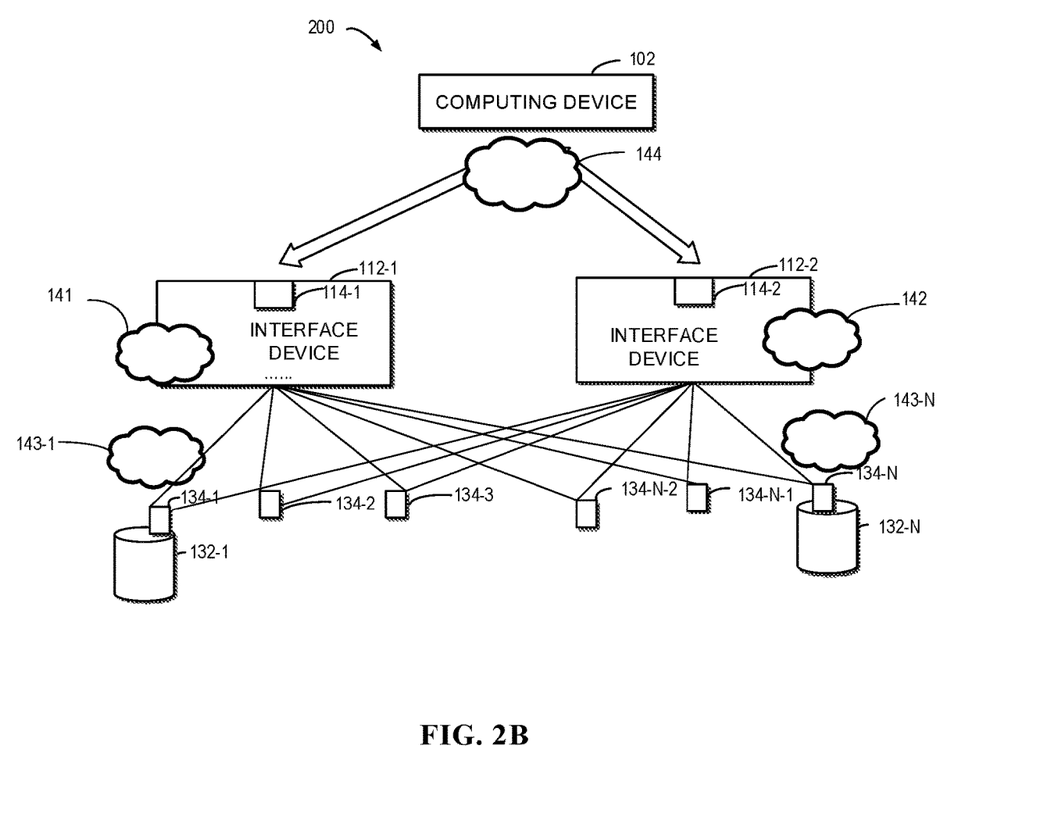
FIG. 2B illustrates a schematic block diagram of an object architecture including the storage system according to embodiments of the present disclosure.

An example block diagram of an object-level architecture in an embodiment according to the present disclosure is shown in FIG. 2B.

Figure 3:
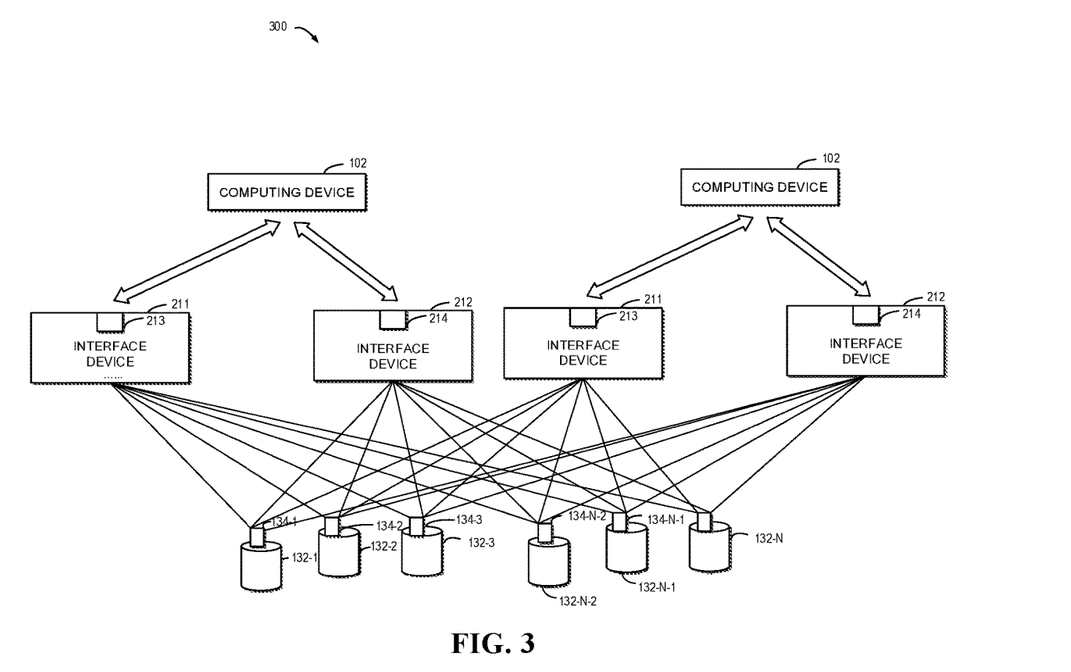
FIG. 3 illustrates a schematic block diagram of the storage system according to embodiments of the present disclosure.

As shown in FIG. 3, the SAS domain management layer object 141 may obtain and set information in the SAS domain, which may include dynamically creating and managing objects associated with the SAS-type storage device for the SAS storage device. For example, if the storage device 132-1 of the slot 134-1 is a SAS storage device, the SAS domain management layer object 141 may generate an object 143-1 associated with the storage device 132-1.

The NVMe domain management layer object 142 may obtain and set information in the NVMe domain, which may include dynamically creating and managing objects associated with the NVMe storage device for the NVMe storage device. For example, if the storage device 132-N of the slot 134-N is an NVMe storage device, the NVMe domain management layer object 142 may generate an object 143-N associated with the storage device 132-N.

The interface device 112-1 can transfer the determined association via the upstream interface 114-1, and the interface device 112-2 can transfer the determined association to the computing device 102 via the upstream interface 114-2, so that the computing device can generate information characterizing (or identifying) the state of the storage device based on the association.

In the embodiments of the present disclosure, the computing device 102 can be regarded as a hardware implementation of the mixed protocol management layer object 144, for example. That is, the computing device 102 is a management device on an upper layer of the interface device 112. In the mixed protocol management layer object 144, all information and operations from the SAS domain management layer object 141 and the NVMe domain management layer object 142 will be combined into this object 144, which means the slot status of SAS storage devices and NVMEs storage devices will be combined.

For example, as shown in FIGS. 2A and 2B, for SAS-type interface devices, the slots 134-1 to 134-N may be considered as slots 134-1 to 134-N that support the SAS protocol. As for the NVMe type interface device, the slots 134-1 to 134-N may be considered as the slots 134-1 to 134-N supporting the NVMe protocol. However, for the computing device 102, it is only considered as the slots 134-1 to 134-N without paying attention to the types of interface protocols it supports.

According to some embodiments, a field programmable gate array (FPGA) is able to manage out-of-band signals of all SAS storage devices for all slots inserted into the SAS storage device. The BMC manages the plug-in detection of the NVME storage device for all slots inserted into the NVMe storage device through the I2C interface. Therefore, SAS or NVMe storage devices may be allowed to be dynamically inserted into any slot.

If the storage system 200 receives a data write request from a user, the storage system 200 can determine the availability of the storage device accessed to the storage system 200. For example, the storage system 200 may determine the available space of the storage device. Based on the attributes of the available storage device, the computing device 102 can route the data to an interface device having a type that matches the attributes of the available storage device, to write the data to the available storage device.

For a high availability storage system, two computing devices can be included to support the redundant architecture of the storage system. FIG. 3 illustrates a redundant architecture 300 that supports a storage system. It can be seen that the storage system 300 may include two computing devices 102 shown in FIG. 2 and corresponding interface devices. The storage devices 132-1 to 132-N are shared between the two computing devices 102 and corresponding interface devices.

The storage device 300 in FIG. 3 is substantially similar to the storage device 200 in FIG. 2 in terms of storage management and data transfer. Therefore, the corresponding description may be omitted.

Figure 4:
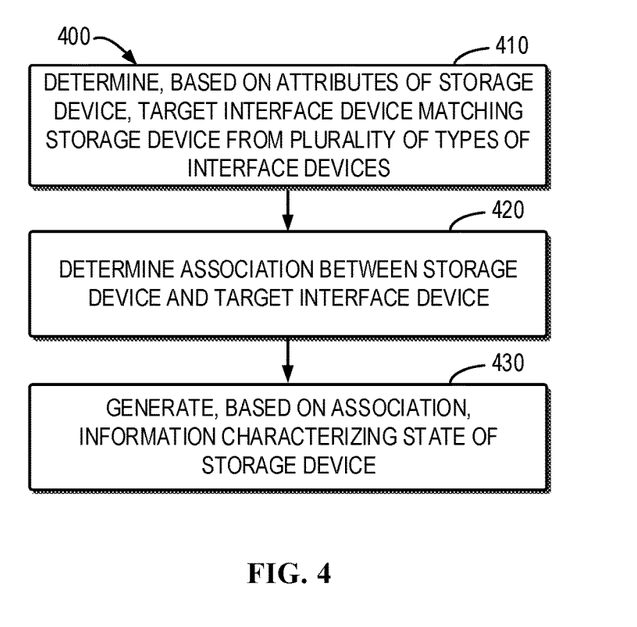
FIG. 4 illustrates a flowchart of method for storage management according to embodiments of the present disclosure.

FIG. 4 illustrates a flowchart of a method 400 for storage management according to embodiments of the present disclosure. The method 400 may be implemented at the computing device 102 of FIG. 2. The method 400 may be described with reference to FIG. 2.

At block 410, if the computing device 102 detects that a storage device 132 is plugged into the storage system 200, the computing device 102 determine, based on the attributes of the storage device 132, a target interface device matching the storage device from a plurality of types of interface devices in the storage system. The interface device managing the storage device having attributes matching one of the plurality of types In some embodiments, the computing device 102 may determine the attributes of the storage device and a target type of the interface device matching the attribute. The computing device 102 may determine a target interface device based on the target type.

In some embodiments, if the computing device 102 determines that the storage device is a SAS type storage device, the computing device 102 determines the SAS type as the target type. In some embodiments, if the computing device 102 determines that the storage device is a NVMe type storage device, the computing device 102 determines the PCIe type as the target type.

In some embodiments, the target interface device may be a SAS expander. In some embodiments, the target interface device may be a PCIe switch.

At block 420, the computing device 102 determines an association between the storage device 132 and the target interface device. And at block 430, the computing device 102 generates, based on the association, information characterizing a state of the storage device in the computing device.

In some embodiments, the information includes at least one of the following: the attributes of the storage device, an identifier of a storage device slot into which the storage device is plugged, and an available capacity of the storage device.

In some embodiments, if the computing device 102 receives a write request for data, the computing device 102 may determine whether the storage device 132 has available storage space. If the storage device 132 has available storage space, the computing device 102 may transfer the data from the computing device to the target interface device, to cause the data to be written to the storage device via the target interface device.

In this way, it is possible to support at least two different types of disks in the existing storage system, improving the compatibility and scalability of the system.

Figure 5:
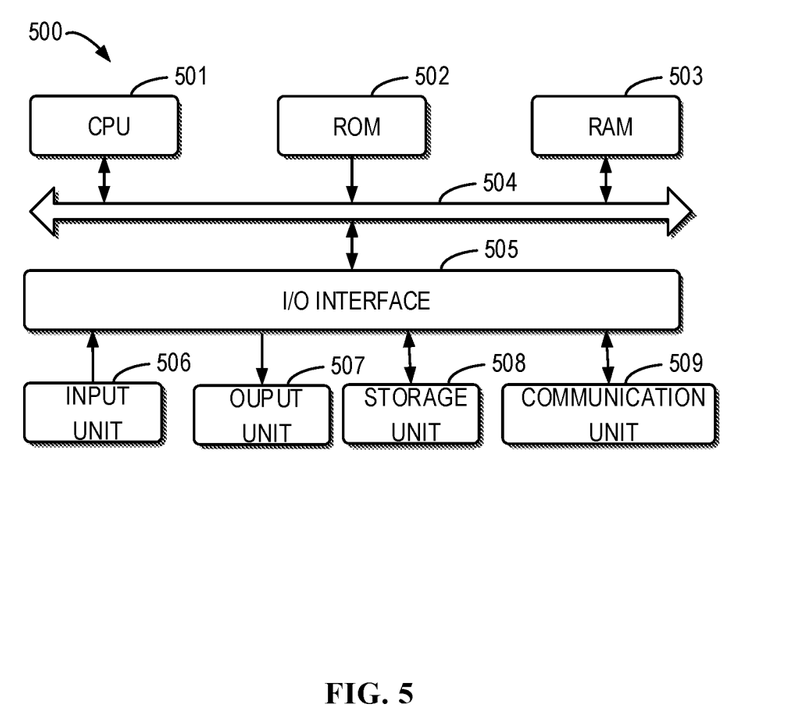
FIG. 5 illustrates a block diagram of an example device that can be used to implement embodiments of the present disclosure.

FIG. 5 is a block diagram illustrating an example device 500 that can be used to implement embodiments of the present disclosure. The device 500 may be any device implemented as or included in the computing device 102.

As shown in FIG. 5, the device 500 includes a central processing unit (CPU) 501 which performs various appropriate acts and processing, based on computer program instructions stored in a read-only memory (ROM) 502 or computer program instructions loaded from a storage unit 508 to a random access memory (RAM) 503. The RAM 503 stores therein various programs and data required for operations of the device 500. The CPU 501, the ROM 502 and the RAM 503 are connected via a bus 504 with one another. An input/output (I/O) interface 505 is also connected to the bus 504.

The following components in the device 500 are connected to the I/O interface 505: an input unit 506 such as a keyboard, a mouse and the like; an output unit 507 including various kinds of displays and a loudspeaker, etc.; a storage unit 508 including a magnetic disk, an optical disk, and etc.; a communication unit 509 including a network card, a modem, and a wireless communication transceiver, etc. The communication unit 509 allows the device 500 to exchange information/data with other devices through a computer network such as the Internet and/or various kinds of telecommunications networks.

Various processes and processing described above, e.g., the method 400, may be executed by the processing unit 501. For example, in some embodiments, the method 400 may be implemented as a computer software program that is tangibly included in a machine readable medium, e.g., the storage unit 508. In some embodiments, part or all of the computer programs may be loaded and/or mounted onto the device 500 via ROM 502 and/or communication unit 509. When the computer program is loaded to the RAM 503 and executed by the CPU 501, one or more steps of the method 400 as described above may be executed.

It is to be understood by those skilled in the art that various steps of the method according to the present disclosure may be implemented via a general purpose computing device, which may be integrated on a single computing device or distributed over a network composed of a plurality of computing devices. Optionally, they may be implemented using program code executable by the computing device, such that they can be stored in a storage device and executed by the computing device; or they may be made into respective integrated circuit modules, or a plurality of modules or steps therein may be made into a single integrated circuit module for implementation. In this way, the present disclosure is not limited to any specific combination of hardware and software.

It would be appreciated that, although several means or sub-means (e.g., specialized circuitry) of the device have been mentioned in the description above, such partition is provided only as an example, without limitation. According to the embodiments of the present disclosure, features and functions of two or more apparatuses described above may be instantiated in one apparatus, in practice. In turn, features and functions of one apparatus described above may be further partitioned to be instantiated by various apparatuses.

What have been mentioned above are merely some optional embodiments of the present disclosure, without suggesting limitation to the present disclosure. For those skilled in the art, the present disclosure may allow various alternations and changes. Any modifications, equivalents and improvements made within the spirits and principles of the present disclosure should be covered within the scope of the present disclosure.

We claim:

1. A method for storage management comprising:
in response to detecting that a first storage device is plugged into a first storage device slot of an enclosure of a storage system, determining, at a computing device of the storage system and based on attributes of the first storage device, a first target interface device by matching a first type of the first target interface device with the attributes of the first storage device, the storage system including a plurality of types of interface devices, the first storage device slot being connected to the respective types of interface devices, the first target interface device being from among the respective types of interface devices;
in response to detecting that a second storage device is plugged into a second storage device slot of the enclosure of the storage system, determining, at the computing device of the storage system and based on attributes of the second storage device, a second target interface device by matching a second type of the second target interface device with the attributes of the second storage device, the second storage device slot being connected to the respective types of interface devices, the second target interface device being from among the respective types of interface devices;
determining a first association between the first storage device and the determined first target interface device;
generating, based on the first association, first information characterizing a state of the first storage device in the computing device;
determining a second association between the second storage device and the determined second target interface device; and
generating, based on the second association, second information characterizing a state of the second storage device in the computing device.

2. The method of claim 1, wherein determining the first target interface device comprises:
determining the attributes of the first storage device;
determining the first type of interface device matching the attributes; and
determining the first target interface device based on the determined first type.

3. The method of claim 2, wherein determining the first type of interface device comprises:
in response to determining that the first storage device is a Serial Attached Small Computer System Interface (SAS) type of storage device, determining that the first type of interface device is the SAS type of interface device.

4. The method of claim 3, wherein the first target interface device is a SAS expander.

5. The method of claim 2, wherein determining the first type of interface device comprises:
in response to determining that the first storage device is a Non-Volatile Memory express (NVMe) type of storage device, determining that the first type of interface device is a Peripheral Component Interconnect Express (PCIe) type of interface device.

6. The method of claim 5, wherein the first target interface device is a PCIe switch.

7. The method of claim 1, wherein the first information comprises at least one of the following:
the attributes of the first storage device;
an identifier of the first storage device slot into which the first storage device is plugged; and
an available capacity of the first storage device.

8. The method of claim 1 further comprising:
in response to receiving a write request for data, determining whether the first storage device has available storage space; and
in response to determining that the first storage device has the available storage space, transferring the data from the computing device to the first target interface device, to cause the data to be written to the first storage device via the first target interface device.

9. An electronic device, comprising:
a processor; and
a memory coupled to the processor storing instructions to be executed, the instructions when executed by the processor causing the device to execute acts of:
in response to detecting that a first storage device is plugged into a first storage device slot of an enclosure of a storage system, determining, at a computing device of the storage system and based on attributes of the first storage device, a first target interface device by matching a first type of the first target interface device with the attributes of the first storage device, the storage system including a plurality of types of interface devices, the first storage device slot being connected to the respective types of interface devices, the first target interface device being from among the respective types of interface devices;
in response to detecting that a second storage device is plugged into a second storage device slot of the enclosure of the storage system, determining, at the computing device of the storage system and based on attributes of the second storage device, a second target interface device by matching a second type of the second target interface device with the attributes of the second storage device, the second storage device slot being connected to the respective types of interface devices, the second target interface device being from among the respective types of interface devices;
determining a first association between the first storage device and the determined first target interface device; generating, based on the first association, first information characterizing a state of the first storage device in the computing device;
determining a second association between the second storage device and the determined second target interface device; and
generating, based on the second association, second information characterizing a state of the second storage device in the computing device.

10. The device of claim 9, wherein determining the first target interface device comprises:
determining the attributes of the first storage device;
determining the first type of the interface device matching the attributes; and
determining the first target interface device based on the determined first type.

11. The device of claim 10, wherein determining the first type of interface device comprises:
in response to determining that the first storage device is a Serial Attached Small Computer System Interface (SAS) type of storage device, determining that the first type of interface device is the SAS type of interface device.

12. The device of claim 11, wherein the first target interface device is a SAS expander.

13. The device of claim 10, wherein determining the first type of interface device comprises:
in response to determining that the first storage device is a Non-Volatile Memory express (NVMe) type of storage device, determining that the first type of interface device is a Peripheral Component Interconnect Express (PCIe) type of interface device.

14. The device of claim 13, wherein the first target interface device is a PCIe switch.

15. The device of claim 9, wherein the first information comprises at least one of the following:
the attributes of the first storage device;
an identifier of the first storage device slot into which the storage device is plugged; and
an available capacity of the first storage device.

16. The device of claim 9, further comprising:
in response to receiving a write request for data, determining whether the first storage device has available storage space; and
in response to determining that the first storage device has the available storage space, transferring the data from the computing device to the first target interface device, to cause the data to be written to the first storage device via the first target interface device.

17. A storage system comprising:
an enclosure having a first storage device slot and a second storage device slot;
a plurality of types of interface devices, wherein the first storage device slot and the second storage device slot are connected to the respective types of interface devices; and
an electronic device, connected to the plurality of types of the interface devices, the electronic device including:
a processor; and
a memory coupled to the processor storing instructions to be executed, the instructions when executed by the processor causing the electronic device to execute acts of:
in response to detecting that a first storage device is plugged into the first storage device slot of the enclosure, determining, at a computing device of the storage system and based on attributes of the first storage device, a first target interface device by matching a first type of the first target interface device with the attributes of the first storage device, the first target interface device being from among the respective types of interface devices;
in response to detecting that a second storage device is plugged into a second storage device slot of the enclosure of the storage system, determining, at the computing device of the storage system and based on attributes of the second storage device, a second target interface device by matching a second type of the second target interface device with the attributes of the second storage device, the second target interface device being from among the respective types of interface devices;
determining a first association between the first storage device and the determined first target interface device;
generating, based on the first association, first information characterizing a state of the first storage device in the computing device;
determining a second association between the second storage device and the determined second target interface device; and
generating, based on the second association, second information characterizing a state of the second storage device in the computing device.

18. A computer program product having a non-transitory computer readable medium which stores a set of instructions to perform storage management; the set of instructions, when carried out by computerized circuitry, causing the computerized circuitry to perform a method of:
in response to detecting that a first storage device is plugged into a first storage device slot of an enclosure of a storage system, determining, at a computing device of the storage system and based on attributes of the first storage device, a first target interface device by matching a first type of the first target interface device with the attributes of the first storage device, the storage system including a plurality of types of interface devices, the first storage device slot being connected to the respective types of interface devices, the first target interface device being from among the respective types of interface devices;
in response to detecting that a second storage device is plugged into a second storage device slot of the enclosure of the storage system, determining, at the computing device of the storage system and based on attributes of the second storage device, a second target interface device by matching a second type of the second target interface device with the attributes of the second storage device, the second storage device slot being connected to the respective types of interface devices, the second target interface device being from among the respective types of interface devices;
determining a first association between the first storage device and the determined first target interface device;
generating, based on the first association, first information characterizing a state of the first storage device in the computing device;
determining a second association between the second storage device and the determined second target interface device; and
generating, based on the second association, second information characterizing a state of the second storage device in the computing device.

* * * * *